UNITED STATES PATENT OFFICE.

GAIL BORDEN, JR., OF GALVESTON, TEXAS.

PREPARATION OF PORTABLE SOUP-BREAD.

Specification forming part of Letters Patent No. 7,066, dated February 5, 1850.

*To all whom it may concern:*

Be it known that I, GAIL BORDEN, Jr., of Galveston, in the county of Galveston and State of Texas, have invented a new and useful Improvement in the manufacture of a Portable Desiccated Soup-Bread; and I do hereby declare that the following is a full, clear, and exact description.

The nature of my invention consists in extracting the nutritious parts of flesh or animal meat of every description and combining this concentrated extract with flour or vegetable meal, and baking the two substances in an oven, thereby forming a portable desiccated soup-bread containing a large amount of the most important alimentary substance in a very small bulk and convenient form, well adapted to seafaring purposes, travelers, hospitals, and also for family use, which will save the trouble and expense of much cooking.

To enable others skilled in the art to make and use my invention, I will proceed to describe its manufacture or the process of making the same.

I take the flesh of a fat animal or of any kind of good eatable fowl, fish, &c., and extract all the nutricious parts out of it for the purpose of mixing it with the meal or vegetable flour. In order to extract the nutritious parts of the flesh, I macerate it with heat or steam until its nutritious or alimentary properties are completely separated from the bony and fleshy parts, and are contained in the broth or soup. I then strain this through strainers of wire and cloth as the best means of obtaining the clear extract, which is further defecated by settling. This broth, being reduced or evaporated by boiling to a consistence liable to burn or scorch, I afterward place into another vessel of boiling liquid. (It may be either water, or in the kettle boiling the meat for a succeeding batch.) The extract is thus reduced by evaporation until it attains to a state of spissitude about the consistency of thick molasses; or the better way is to evaporate the broth or soup by means of steam in a pan or tub, with a steam-pipe coiled in the bottom, and by the vacuum process, after the manner of making clarified sugar from the juice of the cane. During this operation the fat or oily part that rises to the top of the liquid is carefully skimmed off, and does not form any part of the manufactured article. With the animal extract reduced to the consistency described I mix good flour, meal, or an extract of vegetables made into meal, until a dough is formed sufficiently stiff to be rolled into a convenient sheet or webb and cut into pieces by a common cracker-machine suitable for baking. By mixing the flour or meal with the animal extract in a hot state, the dough becomes stiffer when cold, therefore more convenient to handle or work, and more animal extract can be combined with the flour or meal than by employing the said extract when cold. Thus more animal nutriment will be combined with a certain or specified quantity of the flour or meal. I bake the dough, as heretofore described, in a baker's oven properly heated for that purpose. I have not used, nor do I confine myself to any standard; but I prefer to use the oven after a batch of common bread has been baked in it. I allow it to bake slowly until it becomes dry—about the common biscuit or cracknel dryness. The excellence of this portable desiccated soup-bread depends upon the quantity of animal substance used in its manufacture. The extract should be reduced by the process of boiling or evaporation by steam to about one-eleventh the weight of the flesh or animal substance that is first placed in the vessel to macerate.

The bread thus made may be ground into meal, for greater convenience for cooking, and packed, either in the cake or meal, into small tight bags of gutta-percha or other material, such as varnished cotton cloth, for the purpose of keeping out air, water, and moisture. At present I am keeping the bread, both in cakes and ground, in cases of tin and other vessels hermetically sealed, and in air-tight bags, for shipping and other purposes. When open it requires to be kept secure from the changes of the atmosphere. It will keep on shipboard during long voyages in warm climates for a great length of time. To make soup of it, and the bread made fine, add sufficient cold water to form a thin batter, in which let it stand five or ten minutes. Then add more water (boiling water is best) and boil it, stirring frequently during the process. The bread becomes macerated or decomposed in ten to fifteen minutes' boiling. One ounce will make a pint of rich thick soup, and water may be added to reduce or dilute it to any state of consistency to suit the appetite, or suitable for invalids. Add salt and pepper to suit the taste. Cooked vegetables of various kinds or condiments may be used in the mixture.

In hospitals, half an ounce or less of this bread, made of good beef, mutton, or fowls' flesh, could be made into a very nourishing soup suitable for patient or invalid. For seamen on long voyages, or travelers on long journeys through destitute regions, it will be of the utmost importance and of incalculable benefit.

I am well aware that portable soups and concentrated meats, preserved in hermetically-sealed vessels, have been long known and used, but were very inconvenient to pack and carry and liable to deteriorate. My soup-bread is as convenient and portable as any biscuit, while it answers the double purpose of concentrating in the same cake the nutritious properties of animal and vegetable food, which are so essential to the healthful sustenance of man.

This bread is not only useful to mariners, travelers, and hospitals, but for private families, especially in warm weather, as it may be cooked in a chaffing-dish over a few coals or a lamp of alcohol. With a few ounces of this bread in his pocket the geologist or surveyor can, with a match and hunter's cup, make a dish of good, palatable, and healthful soup in a few minutes.

This bread would be every way suitable for export to other countries as an article of food, a great quantity of nutriment being contained in a small bulk, thus saving in the expense of freight. The article being manufactured where beef or other meat is plenty and cheap, and exported to places where meats are both scarce and dear, will prove a mutual benefit to the producer and consumer.

Having thus explained my invention, I do not claim the extract of flesh made into what is known as "portable soup," but

I claim—

The new and useful manufacture of desiccated soup-bread, formed of the concentrated extract of alimentary animal substances combined with vegetable flour or meal made into cakes and baked into bread, in the manner substantially as herein described, for the purpose set forth.

G. BORDEN, JR.

Witnesses:
JAMES WELSH,
O. D. JOHNSON,
R. S. JOHNSON.